United States Patent

Narumi et al.

(12)

(10) Patent No.: US 9,373,845 B2
(45) Date of Patent: Jun. 21, 2016

(54) METHOD FOR PRODUCING FLUORINATED COPOLYMER LATEX, FLUORINATED COPOLYMER LATEX, BINDER FOR PRODUCING ELECTRODE, ELECTRODE MIXTURE FOR STORAGE BATTERY DEVICE, AND ELECTRODE FOR STORAGE BATTERY DEVICE

(71) Applicant: ASAHI GLASS COMPANY, LIMITED, Chiyoda-ku (JP)

(72) Inventors: Mizuna Narumi, Chiyoda-ku (JP); Takehiro Kose, Chiyoda-ku (JP); Hiroki Nagai, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 143 days.

(21) Appl. No.: 13/970,122

(22) Filed: Aug. 19, 2013

(65) Prior Publication Data

US 2013/0330621 A1    Dec. 12, 2013

Related U.S. Application Data

(63) Continuation of application No. PCT/JP2012/053703, filed on Feb. 16, 2012.

(30) Foreign Application Priority Data

Feb. 18, 2011  (JP) ................. 2011-033410

(51) Int. Cl.

| H01M 4/62 | (2006.01) |
|---|---|
| C08F 214/26 | (2006.01) |
| H01G 11/38 | (2013.01) |
| C08F 2/26 | (2006.01) |
| C08F 210/06 | (2006.01) |
| H01M 4/13 | (2010.01) |
| H01G 11/30 | (2013.01) |

(52) U.S. Cl.
CPC ............... H01M 4/623 (2013.01); C08F 2/26 (2013.01); C08F 210/06 (2013.01); C08F 214/265 (2013.01); H01G 11/38 (2013.01); H01G 11/30 (2013.01); H01M 4/13 (2013.01); Y02E 60/13 (2013.01); Y02T 10/7022 (2013.01)

(58) Field of Classification Search
USPC .................................. 524/748, 805
See application file for complete search history.

(56) References Cited

U.S. PATENT DOCUMENTS

| 5,856,417 A * | 1/1999 | Takakura et al. ............. 526/247 |
| 2009/0186986 A1* | 7/2009 | Nomura et al. ............ 525/326.3 |
| 2012/0231332 A1* | 9/2012 | Kose ............................. 429/211 |
| 2013/0236783 A1* | 9/2013 | Kose et al. .................... 429/211 |
| 2015/0044561 A1* | 2/2015 | Kose et al. .................... 429/217 |

FOREIGN PATENT DOCUMENTS

| JP | 50-86585 | 7/1975 |
| JP | 55-127412 | 10/1980 |
| JP | 9-306474 | 11/1997 |
| JP | 11-171934 | 6/1999 |
| JP | 2006-36986 | 2/2006 |
| JP | 2007-211233 | 8/2007 |
| JP | 2009-146871 | 7/2009 |
| JP | 2010-70741 | 4/2010 |
| JP | 2010-287497 | 12/2010 |
| WO | WO-2011/055760 A1 * | 5/2011 |

OTHER PUBLICATIONS

International Search Report issued Mar. 13, 2012 in PCT/JP2012/053703 filed Feb. 16, 2012.
U.S. Appl. No. 14/524,856, filed Oct. 27, 2014, Kose, et al.
U.S. Appl. No. 14/657,475, filed Mar. 13, 2015, Kose, et al.

* cited by examiner

*Primary Examiner* — Peter D Mulcahy
*Assistant Examiner* — Henry Hu
(74) *Attorney, Agent, or Firm* — Oblon, McClelland, Maier & Neustadt, L.L.P

(57) ABSTRACT

To produce a method for producing a fluorinated copolymer latex with a low content of metal components and with favorable stability of the latex even with a low content of an organic solvent. A method for producing a fluorinated copolymer latex, which comprises emulsion-polymerizing a monomer mixture containing tetrafluoroethylene and propylene in the presence of an aqueous medium, an anionic emulsifying agent and a thermally decomposable radical polymerization initiator at a polymerization temperature within a range of from 50° C. to 100° C., wherein the aqueous medium comprises water alone, or water and a water-soluble organic solvent, and the content of the water-soluble organic solvent is less than 1 part by mass per 100 parts by mass of water; and the amount of use of the anionic emulsifying agent is from 1.5 to 5.0 parts by mass per 100 parts by mass of the fluorinated copolymer to be formed.

13 Claims, No Drawings

METHOD FOR PRODUCING FLUORINATED COPOLYMER LATEX, FLUORINATED COPOLYMER LATEX, BINDER FOR PRODUCING ELECTRODE, ELECTRODE MIXTURE FOR STORAGE BATTERY DEVICE, AND ELECTRODE FOR STORAGE BATTERY DEVICE

TECHNICAL FIELD

The present invention relates to a method for producing a fluorinated copolymer latex, a fluorinated copolymer latex, a binder for producing an electrode comprising the fluorinated copolymer latex, an electrode mixture for a storage battery device containing the fluorinated copolymer latex, and an electrode for a storage battery device formed by using the electrode mixture for a storage battery device.

BACKGROUND ART

Heretofore, a fluorinated copolymer comprising tetrafluoroethylene and propylene has been applied to severe environment which a conventional rubber material cannot withstand, as a rubber material very excellent in the heat resistance and the chemical resistance.

In recent years, utilizing its voltage resistance, oxidation resistance and chemical resistance, it has been developed as a binder polymer for producing an electrode for a storage battery device such as a capacitor, a primer battery and a secondary battery for electronic devices or electric cars, for which a high output, a high capacity and excellent cycle properties are required.

As a binder to be used for producing an electrode for a storage battery device (hereinafter referred to as a binder for producing an electrode), mainly an organic solvent binder having a binder polymer dissolved in an organic solvent or an aqueous binder having a binder polymer dissolved or dispersed in water is used. Since an organic solvent binder which contains an organic solvent has a high environmental burden and is problematic in view of work environment, an aqueous binder particularly attracts attention in recent years.

Patent Document 1 discloses a method for preparing a paste for electrode coating without using a solvent, by using an aqueous dispersion having a copolymer of propylene and tetrafluoroethylene emulsified or dispersed in water. However, it failed to disclose a method for producing such a copolymer.

Patent Document 2 discloses, as a method of copolymerizing propylene and tetrafluoroethylene in an aqueous medium, a method of carrying out a copolymerization reaction in the presence of an oxidation-reduction catalyst (a so-called redox catalyst) comprising a water-soluble persulfate, a water-soluble iron salt, a hydroxymethane sulfinate, and ethylenediamine tetraacetic acid or its salt.

However, for a sealing material of a semiconductor production apparatus and for a material for an electronic industry such as a binder for producing an electrode of a secondary battery, for which a low content of metal components is required, a method of using a redox catalyst including iron is not favorable.

Particularly if a binder for producing an electrode of a secondary battery contains a metal component such as iron, copper or sodium, the initial capacity of the battery may deteriorate, or the performance may be lowered due to deposition on an electrode, and it is required to reduce the content of metal components as far as possible.

Patent Document 3 discloses a method of producing a fluorinated copolymer latex by emulsion polymerization in an aqueous medium, recovering a polymer from the latex and use it as a material for a crosslinked fluorinated rubber. It discloses that in the emulsion polymerization step, the fluorinated copolymer latex can be produced utilizing a reaction by thermal decomposition of a thermally decomposable radical initiator, even without employing a reaction by a redox catalyst.

PRIOR ART DOCUMENTS

Patent Documents

Patent Document 1: JP-A-9-306474
Patent Document 2: JP-A-55-127412
Patent Document 3: JP-A-2007-211233

DISCLOSURE OF INVENTION

Technical Problem

According to the method disclosed in Patent Document 3, a fluorinated copolymer latex with a low content of metal components can be obtained without using a redox catalyst, however, a mixture of water and tert-butanol is used as an aqueous medium. It is preferred not to use an organic solvent such as tert-butanol as far as possible in view of the work environment.

However, according to studies by the present inventors, if the content of tert-butanol in the aqueous medium for the emulsion polymerization is reduced in the method as disclosed in Patent Document 3, the stability of the obtained fluorinated copolymer latex is lowered. Accordingly, when the latex is stirred, particles of the fluorinated copolymer are likely to be united, and the proportion of breakage of the latex tends to be high, such being problematic.

Under these circumstance, it is an object of the present invention to provide a method for producing a fluorinated copolymer latex with a low content of metal components and with favorable stability of the latex even with a low content of an organic solvent.

The present invention further provides a fluorinated copolymer latex with a low content of metal components and with favorable stability even with a low content of an organic solvent, a binder for producing an electrode comprising the fluorinated copolymer latex, an electrode mixture for a storage battery device containing the fluorinated copolymer latex, and an electrode for a storage battery device using the electrode mixture for a storage battery device.

Solution to Problem

The present inventors have conducted extensive studies and as a result, found that when a fluorinated copolymer is to be prepared by emulsion polymerization utilizing a reaction by thermal decomposition of a thermally decomposable radical initiator, without using a redox catalyst, favorable stability of the obtained fluorinated copolymer latex can be achieved even in a case where the aqueous medium consists only of water, by controlling the amount of use of an anionic emulsifying agent, and accomplished the present invention.

The present invention provide the following [1] to [14].

[1] A method for producing a fluorinated copolymer latex, which comprises emulsion-polymerizing a monomer mixture containing tetrafluoroethylene and propylene in the presence of an aqueous medium, an anionic emulsifying agent and a thermally decomposable radical polymerization initiator at a polymerization temperature within a range of from 50° C. to 100° C. to produce a latex of a fluorinated copolymer, wherein the aqueous medium comprises water alone, or water and a water-soluble organic solvent, and the content of the water-soluble organic solvent is less than 1 part by mass per 100 parts by mass of water; and the amount of use of the anionic emulsifying agent is from 1.5 to 5.0 parts by mass per 100 parts by mass of the fluorinated copolymer to be formed.

[2] The method for producing a fluorinated copolymer latex according to [1], wherein the anionic emulsifying agent is sodium lauryl sulfate.

[3] The method for producing a fluorinated copolymer latex according to [1] or [2], wherein the monomer mixture consists of tetrafluoroethylene and propylene.

[4] The method for producing a fluorinated copolymer latex according to any one of [1] to [3], wherein the emulsion polymerization is carried out in the absence of a pH adjusting agent.

[5] The method for producing a fluorinated copolymer latex according to any one of [1] to [4], wherein the application of the obtainable fluorinated copolymer latex is a binder for producing an electrode of a storage battery device.

[6] The method for producing a fluorinated copolymer latex according to any one of [1] to [5], wherein an alkali metal salt is used as the anionic emulsifying agent, and the content of metal components in the obtainable fluorinated copolymer latex, including the alkali metal component of the anionic emulsifying agent, is at most 0.2 mass % per 100 mass % of the fluorinated copolymer latex.

[7] A fluorinated copolymer latex comprising an aqueous medium, and particles of a fluorinated copolymer and an anionic emulsifying agent contained in the aqueous medium, wherein the aqueous medium comprises water alone, or water and a water-soluble organic solvent, and the content of the water-soluble organic solvent is less than 1 part by mass per 100 parts by mass of water;

the content of the anionic emulsifying agent is from 1.5 to 5.0 parts by mass per 100 parts by mass of the fluorinated copolymer; and the content of metal components in the fluorinated copolymer latex is at most 0.2 Mass % per 100 mass % of the fluorinated copolymer latex.

[8] The fluorinated copolymer latex according to [7], wherein the iron content in the fluorinated copolymer latex is at most 100 ppm per 100 mass % of the fluorinated copolymer latex.

[9] The fluorinated copolymer latex according to [7] or [8], wherein the content of the fluorinated copolymer is from 5 to 40 mass % per 100 mass % of the fluorinated copolymer latex.

[10] The fluorinated copolymer latex according to any one of [7] to [9], wherein the mass average molecular weight of the fluorinated copolymer is from 10,000 to 300,000.

[11] The fluorinated copolymer latex according to any one of [7] to [10], wherein the average particle size of the particles of the fluorinated copolymer is from 20 to 200 nm.

[12] A binder for producing an electrode of a storage battery device, comprising the fluorinated copolymer latex as defined in any one of [7] to [11].

[13] An electrode mixture for a storage battery device, comprising the fluorinated copolymer latex as defined in any one of [7] to [11], and an electrode active material.

[14] An electrode for a storage battery device, comprising a current collector and an electrode active material layer formed by using the electrode mixture for a storage battery device as defined in [13] on the current collector.

ADVANTAGEOUS EFFECTS OF INVENTION

According to the production method of the present invention, a fluorinated copolymer latex having a low content of metal components, a low content of an organic solvent and favorable stability, can be obtained.

In the present invention, favorable stability of a latex means that copolymer particles in the latex are hardly changed even when an external force is applied thereto, and means, for example, that the fluorinated copolymer particles are less likely to be united when a shearing force e.g. by stirring is applied to the latex. If the copolymer particles are united, a particle size distribution of the copolymer particles will not be obtained as designed, and thus no desired effects will be obtained.

For example, in a case where the copolymer particles are to be used for a binder polymer of an electrode mixture, uniting of the copolymer particles will lead to uneven distribution of the binder polymer in the electrode mixture, and the adhesion between an electrode active material and a current collector tends to be impaired.

The fluorinated copolymer latex of the present invention has a low content of metal components, a low content of an organic solvent and favorable stability.

The binder for producing an electrode comprising the fluorinated copolymer latex of the present invention has a low content of metal components, a low content of an organic solvent and favorable stability, whereby copolymer particles are hardly united in it, and an electrode active material can favorably be dispersed.

The electrode mixture for a storage battery device containing the fluorinated copolymer latex of the present invention has a low content of metal components, a low content of an organic solvent and favorable stability, whereby copolymer particles are hardly united in it, the electrode active material can favorably be dispersed, and favorable adhesion between the electrode active material and a current collector will be obtained.

The electrode for a storage battery device using the electrode mixture for a storage battery device of the present invention has a favorable adhesion between the active electrode material and the current collector, whereby a storage battery device excellent in the charge and discharge properties will be obtained.

DESCRIPTION OF EMBODIMENTS

<Method for Producing Fluorinated Copolymer Latex>

The method for producing a fluorinated copolymer latex of the present invention is a method for producing a fluorinated copolymer latex by emulsion-polymerizing a monomer mixture containing tetrafluoroethylene and propylene in the presence of an aqueous medium, an anionic emulsifying agent and a thermally decomposable radical polymerization initiator.

[Monomer Mixture]

The fluorinated copolymer in the present invention is a copolymer of a monomer mixture containing tetrafluoroethylene (hereinafter referred to as TFE) and propylene (hereinafter referred to as P). That is, the fluorinated copolymer has repeating units based on TFE (hereinafter referred to as TFE units) and repeating units based on P (hereinafter referred to as P units).

The composition (the proportion of repeating units) of the fluorinated copolymer can be controlled by the proportion of the monomers present in the system at the time of the emulsion polymerization.

In the fluorinated copolymer, the molar ratio of TFE units/P units is preferably from 30/70 to 70/30, more preferably from 45/55 to 65/35, particularly preferably from 50/50 to 60/40. When the molar ratio of TFE units/P units is within the above range, the fluorinated copolymer will be excellent in the chemical resistance and mechanical properties, and when used as a binder polymer for producing an electrode, its swelling in an electrolytic solution tends to be small even at high temperature, and excellent adhesion between electrode active materials and adhesion between an electrode active material and a current collector will be obtained.

In the fluorinated copolymer, repeating units based on another monomer may be contained in addition to TFE and P, within a range not to impair the effects of the present invention. Such another monomer may, for example, be a fluorinated monomer such as a fluorinated olefin (such as vinylidene fluoride, hexafluoropropylene, chlorotrifluoroethylene or perfluoro(butylethylene)), or a fluorinated vinyl ether (such as perfluoro(propyl vinyl ether) or perfluoro(methyl vinyl ether)); or a hydrocarbon monomer such as an α-olefin (such as ethylene or 1-butene), a vinyl ether (such as ethyl vinyl ether, butyl vinyl ether or hydroxybutyl vinyl ether), or a vinyl ester (such as vinyl acetate, vinyl benzoate, vinyl crotonate or vinyl methacrylate). Such another monomer may be used alone or in combination of two or more.

In the fluorinated copolymer, the total content of repeating units based on another monomer is preferably at most 10 mol %, more preferably at most 5 mol %, particularly preferably 0. That is, it is particularly preferred that the monomer mixture to be used for producing the fluorinated copolymer consists of TFE and P.

[Aqueous Medium]

The aqueous medium in the present invention comprises water alone or a mixture of water and a water-soluble organic solvent. As the water-soluble organic solvent, known solvents may properly be used. It is preferably an alcohol, particularly preferably tert-butanol.

The content of the water-soluble organic solvent in the aqueous medium is preferably low. Specifically, the content of the water-soluble organic solvent is less than 1 part by mass, preferably at most 0.5 part by mass, more preferably at most 0.1 part by mass, particularly preferably 0, per 100 parts by mass of water.

That is, it is particularly preferred to use water containing no water-soluble organic solvent alone as the aqueous medium.

When the content of the water-soluble organic solvent is within the above range, when the obtainable fluorinated copolymer latex is used as a binder for producing an electrode, the possibility of problems in handling such as the work environmental measure in the process for producing an electrode for a storage battery device can be reduced.

[Anionic Emulsifying Agent]

As the anionic emulsifying agent, emulsifying agents known in the emulsion polymerization method may be used. It may, for example, be specifically a hydrocarbon type emulsifying agent such as sodium lauryl sulfate, sodium dodecylbenzene sulfonate, a sodium alkyl sulfonate, a sodium alkylbenzene sulfonate, a sodium succinic acid dialkyl ester sulfonate or a sodium alkyldiphenyl ether disulfonate; a fluorinated alkyl carboxylate such as ammonium perfluorooctanoate or ammonium perfluorohexanoate; or a compound represented by the following formula (I) (hereinafter referred to as compound (I)).

$$F(CF_2)_pO(CF(X)CF_2O)_qCF(X)COOA \quad (I)$$

In the formula (I), X is a fluorine atom or a $C_{1-3}$ perfluoroalkyl group, A is a hydrogen atom, an alkali metal atom or —$NH_4$, p is an integer of from 1 to 10, and q is 0 or an integer of from 1 to 3.

As Examples of the compound (I), the following compounds may be mentioned.

$F(CF_2)_2OCF_2CF_2OCF_2COONH_4$,
$F(CF_2)_2O(CF_2CF_2O)_2CF_2COONH_4$,
$F(CF_2)_3O(CF(CF_3)C F_2O)_2CF(CF_3)COONH_4$,
$F(CF_2)_3OCF_2CF_2OCF_2COONH_4$,
$F(CF_2)_3O(CF_2CF_2O)_2CF_2COONH_4$,
$F(CF_2)_4OCF_2CF_2OCF_2COONH_4$,
$F(CF_2)_4O(CF_2CF_2O)_2CF_2COONH_4$,
$F(CF_2)_2OCF(CF_3)CF_2OCF(CF_3)COONH_4$,
$F(CF_2)_2OCF_2CF_2OCF_2COONa$,
$F(CF_2)_2O(CF_2CF_2O)_2CF_2COONa$,
$F(CF_2)_3OF_2CF_2OCF_2COONa$,
$F(CF_2)_3O(CF_2CF_2O)_2CF_2COONa$,
$F(CF_2)_4OCF_2CF_2OCF_2COONa$,
$F(CF_2)_4O(CF_2CF_2O)_2CF_2COONa$, and the like.

The anionic emulsifying agent may be used alone or in combination of two or more. As the anionic emulsifying agent, sodium lauryl sulfate is particularly preferred, with which excellent dispersion stability of the fluorinated copolymer latex will be obtained.

The amount of use of the anionic emulsifying agent is from 1.5 to 5.0 parts by mass, preferably from 1.5 to 3.8 parts by mass, particularly preferably from 1.7 to 3.2 parts by mass per 100 parts by mass of the fluorinated copolymer formed by the emulsion polymerization.

When the content of the anionic emulsifying agent in the fluorinated copolymer latex is within such a range, excellent stability of the latex will be obtained, and when such a latex is used as a binder for producing an electrode, excellent charge and discharge properties are obtained.

[Thermally Decomposable Radical Polymerization Initiator]

The thermally decomposable radical polymerization initiator in the production method of the present invention is a water-soluble one with a one-hour half-life temperature of from 50 to 100° C. It may properly be selected from water-soluble polymerization initiators to be used for conventional emulsion polymerization. It may, for example, be specifically a persulfate such as ammonium persulfate, sodium persulfate or potassium persulfate; disuccinic acid peroxide; or an organic initiator such as azobisisobutyramidine dihydrochloride. Among them, a persulfate is preferred, and ammonium persulfate is particularly preferred, whereby an appropriate polymerization rate will be obtained, excellent polymerization stability will be obtained, and high productivity will be obtained.

The amount of use of the thermally decomposable radical polymerization initiator is preferably from 0.0001 to 3 parts by mass, more preferably from 0.001 to 1 part by mass per 100 parts by mass of the fluorinated copolymer formed by the emulsion polymerization.

[pH Adjusting Agent]

In the emulsion polymerization, a pH adjusting agent may be added. The pH adjusting agent in the present invention means an inorganic salt. An inorganic salt known as a pH adjusting agent in the emulsion polymerization method may be used. It may, for example, be specifically a phosphate such as disodium hydrogen phosphate or sodium dihydrogen phosphate; or a carbonate such as sodium hydrogencarbonate or sodium carbonate. More preferred specific examples of a phosphate include disodium hydrogen phosphate dihydrate or disodium hydrogen phosphate dodecahydrate. Further, to adjust the pH to a desired value, a base such as sodium hydroxide or potassium hydroxide; or an acid such as sulfuric acid, hydrochloric acid or nitric acid; or the like may be used in combination.

By addition of the pH adjusting agent, the polymerization rate or stability of the obtainable latex may be improved.

To reduce the content of metal components in the fluorinated copolymer latex, the amount of use of the pH adjusting agent is preferably as small as possible. Accordingly, it is preferred to carry out the emulsion polymerization in the absence of a pH adjusting agent.

In a case where a compound containing an alkali metal component such as sodium salt is used for the anionic emulsifying agent, the thermally decomposable radical polymerization initiator or the pH adjusting agent, this alkali metal component is included in the metal components in the fluorinated copolymer latex to be produced. Accordingly, when the obtainable fluorinated copolymer latex is used for an application to e.g. a binder for producing an electrode for a storage battery device, the alkali metal component derived from such a compound is preferably small. The fluorinated copolymer latex obtained by the production method of the present invention is not necessarily used for an application to e.g. a binder for producing an electrode of a storage battery device as it is. However, unless a treatment to particularly reduce the metal components in the obtained fluorinated copolymer latex is carried out, the metal components in the fluorinated copolymer latex obtained by the production method of the present invention tend to be metal components in the fluorinated copolymer latex to be used for an application to e.g. a binder for producing an electrode, as they are. Although it is possible to reduce the content of the metal components in the obtained latex e.g. by a method of diluting the fluorinated copolymer latex obtained by the production method of the present invention with e.g. an aqueous medium to a certain extent, it is preferred to produce a latex with small metal components in the method for producing the fluorinated copolymer latex.

As describe above, the content of the metal components in the fluorinated copolymer latex to be used for an application to e.g. a binder for producing an electrode is preferably at most 0.2 mass %, more preferably at most 0.15 mass %, further preferably at most 0.1 mass %, particularly preferably at most 0.05 mass %, per 100 mass % of the fluorinated copolymer latex. Accordingly, it is preferred to produce the fluorinated copolymer latex so that the upper limit of the content of the metal components in the fluorinated copolymer latex obtained by the production method of the present invention to be such a value.

Accordingly, in a case where a compound containing an alkali metal component such as sodium salt is used for the anionic emulsifying agent, the thermally decomposable radical polymerization initiator or the pH adjusting agent, it is preferred to produce the fluorinated copolymer latex so that the content of metal components in the obtained fluorinated copolymer latex, including the above alkali metal component, is at most 0.2 mass % per 100 mass % of the fluorinated copolymer latex.

It is preferred to use a compound containing an alkali metal component particularly for the anionic emulsifying agent, among the anionic emulsifying agent, the thermally decomposable radical polymerization initiator and the pH adjusting agent. Accordingly, it is preferred to use an alkali metal salt as the anionic emulsifying agent and to produce the fluorinated copolymer latex so that the content of metal components in the obtained fluorinated copolymer latex including the alkali metal component in the anionic emulsifying agent is at most 0.2 mass % per 100 mass % of the fluorinated copolymer latex.

[Emulsion Polymerization]

The emulsion polymerization may be carried out by a known emulsion polymerization method. It may be carried out by the following procedure for example.

First, a pressure resistant reactor is deaerated, and into the reactor, the aqueous medium, the anionic emulsifying agent and the thermally decomposable radical polymerization initiator are charged. Then, the temperature is raised to a predetermined polymerization temperature, and a monomer mixture containing TFE and P is injected so that a predetermined polymerization pressure is achieved. Immediately after supply of the monomer mixture is started, a polymerization reaction will not occur, and the monomers are dissolved in a liquid in the reactor. No copolymer is formed. Once the polymerization initiator is activated and the polymerization reaction starts, the pressure in the reactor starts decreasing. That is, the start of the polymerization reaction (initial point of the reaction time) is confirmed by a decrease in the pressure in the reactor.

After a decrease in the pressure in a reactor is confirmed, the monomer mixture containing TFE and P is additionally supplied, and while the predetermined polymerization temperature and the predetermined polymerization pressure are maintained, the polymerization reaction is carried out to form a copolymer.

The period after supply of the monomer mixture is started to immediately before additional supply of the monomer mixture after confirmation of the decrease in the pressure in the reactor, will be referred to as an initial activation period in this specification, and the period during which the monomer mixture is additionally supplied to form the copolymer will be referred to as a polymerization reaction period.

In the polymerization reaction period, the composition of the monomer mixture additionally supplied to the reactor is set to be the same proportion (aimed composition) of the repeating units in the copolymer to be obtained.

After the total amount of the monomer mixture additionally supplied in the polymerization reaction period reached a predetermined amount, the interior of the reactor is cooled to terminate the polymerization reaction (end point of the reaction time), to obtain a fluorinated copolymer latex.

In the present invention, the total amount of the monomers additionally supplied in the polymerization reaction period and the amount of the fluorinated copolymer formed by the emulsion polymerization are considered to be equal.

In the polymerization reaction period, the polymerization temperature is from 50° C. to 100° C., and the upper limit is preferably less than 100° C. The polymerization temperature is more preferably within a range of from 60° C. to 90° C., particularly preferably from 65° C. to 80° C. When the polymerization temperature is within such a range, the polymerization rate is appropriate and is likely to be controlled, and further, excellent productivity will be obtained, and favorable stability of the latex is likely to be obtained.

In the polymerization reaction period, the polymerization pressure is preferably from 1.0 to 10 MPaG, more preferably from 1.5 to 5.0 MPaG, particularly preferably from 1.7 to 3.0 MPaG. If the polymerization pressure is less than 1.0 MPaG, the polymerization rate is too low in some cases. Within the above range, the polymerization rate is appropriate and is likely to be controlled, and excellent productivity will be obtained.

In the polymerization reaction period, the polymerization rate per unit time·unit volume is preferably from 10 to 150 g/L·hour, more preferably from 30 to 100 g/L·hour, particularly preferably from 50 to 80 g/L·hour. When the polymerization rate is at least the lower limit of the above range, favorable productivity is likely to be obtained, and when it is at most the upper limit, the polymerization is less likely to be unstable, and favorable stability of the latex is likely to be obtained.

The composition of the monomer mixture supplied to the reactor in the initial activation period is calculated from the monomer reactivity ratio. The composition is specifically preferably set so that the molar ratio of TFE/P is from 5/95 to 98/2, more preferably from 40/60 to 95/5, most preferably from 50/50 to 93/7.

In the initial activation period, the polymerization temperature is preferably the same as the polymerization temperature in the polymerization reaction period.

In the initial activation period, the polymerization pressure is preferably the same as the polymerization pressure in the polymerization reaction period.

[Fluorinated Copolymer]

In the fluorinated copolymer latex obtained by the emulsion polymerization, the fluorinated copolymer is dispersed in a state of particles (in this specification, sometimes referred to as "copolymer particles" in an aqueous dispersion.

The mass average molecular weight of the fluorinated copolymer is preferably from 10,000 to 300,000, more preferably from 20,000 to 250,000, further preferably from 20,000 to 200,000, particularly preferably from 30,000 to 190,000. When the mass average molecular weight is at least 10,000, when such a copolymer is used as a binder polymer for producing an electrode, it is hardly swelled in an electrolytic solution, and when the mass average molecular weight is at most 300,000, favorable binding property of an electrode active material is likely to be obtained. The mass average molecular weight may be adjusted by a known method, for example, by addition of a chain transfer agent, control of the polymerization temperature, or control of the polymerization pressure.

The mass average molecular weight (Mw) in this specification is a molecular weight calculated as polystyrene obtained by measurement by gel permeation chromatography using an analytical curve prepared by using a standard polystyrene sample having a known molecular weight.

The average particle size of the fluorinated copolymer particles is preferably from 20 to 200 nm, more preferably from 30 to 150 nm, further preferably from 50 to 150 nm, particularly preferably from 50 to 100 nm. If the average particle size is smaller than 10 nm, if such a fluorinated copolymer is used as a binder polymer for producing an electrode, the entire surface of the electrode active material may be densely covered, thus increasing the internal resistance in some cases. If the internal resistance increases, the battery properties will be lowered. On the other hand, when the average particle size is at most 200 nm, favorable binding property of the electrode active material is likely to be obtained. The average particle size of the copolymer particles may be adjusted by a known method, e.g. by the type or the addition amount of the emulsifying agent.

In the present invention, the average particle size of the particles of the fluorinated copolymer is a value measured by a dynamic light scattering method using e.g. laser zeta electrometer ELS-8000 manufactured by Otsuka Electronics Co., Ltd.

In the fluorinated copolymer latex obtained by the emulsion polymerization, the content of the fluorinated copolymer is preferably from 5 to 40 mass %, more preferably from 10 to 40 mass %, further preferably from 15 to 35 mass %, particularly preferably from 25 to 35 mass %. When the content of the fluorinated copolymer in the fluorinated copolymer latex is at least the lower limit of the above range, when such a latex is used as a binder for producing an electrode of a storage battery device to prepare an electrode mixture, a favorable viscosity of the electrode mixture is likely to be obtained, and coating with a high thickness on a current collector can be carried out. When the content of the fluorinated copolymer is at most the upper limit of the above range, when an electrode active material or the like is dispersed in the latex to prepare an electrode mixture, favorable dispersion stability is likely to be obtained, and favorable coating property of the electrode mixture is likely to be obtained.

<Fluorinated Copolymer Latex>

The fluorinated copolymer latex of the present invention may be a fluorinated copolymer latex obtained by the production method of the present invention as it is, or may be one having processing or the like to a fluorinated copolymer latex obtained by the production method of the present invention. For example, one having a fluorinated copolymer latex obtained by the production method of the present invention diluted with an aqueous medium, or one obtained by newly adding an additive such as an emulsifying agent, may be mentioned. Preferably, a fluorinated copolymer latex obtained by the production method of the present invention is the fluorinated copolymer latex of the present invention.

In a case where the fluorinated copolymer latex obtained by the production method of the present invention is diluted, it may be diluted with the same aqueous medium as the aqueous medium used for the emulsion polymerization, or may be diluted with a different aqueous medium. It is preferably diluted with substantially water alone. The lower limit of the content of the fluorinated copolymer in the fluorinated copolymer latex after dilution is preferably the lower limit of the above range. That is, the lower limit of the content of the fluorinated copolymer is preferably 5 mass %, more preferably 10 mass %, further preferably 15 mass %, particularly preferably 25 mass %.

To the fluorinated copolymer latex obtained by the production method of the present invention, an emulsifying agent may further be added. That is, the anionic emulsifying agent is contained in the emulsion polymerization for the fluorinated copolymer to obtain a fluorinated copolymer latex, and further an emulsifying agent may be added. The emulsifying agent added after the emulsion polymerization is not limited to the above-described anionic emulsifying agent, and known various emulsifying agents may be used. Further, the emulsifying agent added after the emulsion polymerization may be the same as or different from the emulsifying agent used for the emulsion polymerization.

The fluorinated copolymer latex of the present invention may contain a solid content other than particles of the fluorinated copolymer within a range not to impair the effects of the present invention, however, the solid content in the fluorinated copolymer latex preferably consists of the particles of the fluorinated copolymer.

In a case where the fluorinated copolymer latex contains a solid content other than the particles of the fluorinated copolymer, the solid content concentration in the fluorinated copolymer latex is preferably from 5 to 40 mass %, more preferably from 10 to 40 mass %, further preferably from 15 to 35 mass %, particularly preferably from 25 to 35 mass %.

In the present invention, a problem such that the copolymer particles in the latex are united by the stirring force when the electrode active material or the like is dispersed in the fluorinated copolymer latex, is more likely to occur as the viscosity of the latex is higher and the stirring force required for the dispersion is larger. For example, the higher the content of the fluorinated copolymer in the latex, or the higher the mass average molecular weight of the fluorinated copolymer, the higher the viscosity of the latex. Further, if the particle size of the fluorinated copolymer particles is large, the copolymer particles are likely to be united.

The fluorinated copolymer latex of the present invention is excellent in stability, and accordingly particularly higher effects will be obtained when the viscosity of the latex is high, whereby the stirring force required for dispersion is high.

[Content of Metal Components]

In the present invention, the metal components in the fluorinated copolymer latex mean components of sodium, potassium, magnesium, iron, copper, calcium, chromium, manganese, nickel, cobalt and zinc. Accordingly, the content of the metal components is the total content of components of sodium, potassium, iron, copper, calcium, magnesium, chromium, manganese, nickel, cobalt and zinc.

The metal components in the fluorinated copolymer latex are mainly derived from the materials used for the emulsion polymerization. For example, iron is derived mainly from the redox catalyst, and since the redox catalyst is not used in the present invention, the content of iron derived from the catalyst is low. Sodium is mainly derived from the anionic emulsifying agent. In addition, metal impurities derived from a reaction apparatus such as a polymerization tank may also be conceivable.

The content of the metal components is preferably at most 0.2 mass %, more preferably at most 0.15 mass %, further preferably at most 0.1 mass %, particularly preferably at most 0.05 mass % per 100 mass % of the fluorinated copolymer latex.

The most of the metal components in the fluorinated copolymer latex is sodium. The content of sodium is preferably less than 0.2 mass %, more preferably less than 0.15 mass %, further preferably less than 0.1 mass %, particularly preferably less than 0.05 mass % per 100 mass % of the fluorinated copolymer latex.

Further, the content of iron is preferably at most 100 ppm, more preferably at most 50 ppm, further preferably less than 20 ppm, particularly preferably less than 10 ppm per 100 mass % of the fluorinated copolymer latex.

Among the other metal components, the content of potassium in the fluorinated copolymer latex is low unless a potassium salt is used for the anionic emulsifying agent, the thermally decomposable radical polymerization initiator or the pH adjusting agent. The content of potassium is preferably at most 100 ppm per 100 mass % of the fluorinated copolymer latex.

Further, the influences of magnesium, copper, calcium, chromium, manganese, nickel, cobalt and zinc over a storage battery device are small as compared with iron, and their contents in the fluorinated copolymer latex are usually at the same level as iron or lower. Accordingly, the respective contents of these metal components should be the same level as the content of iron or lower, and the respective components of the metal components are preferably at most 100 ppm, more preferably less than 20 ppm, particularly preferably less than 10 ppm per 100 mass % of the fluorinated copolymer latex.

When the content of the metal components is within the above range, when the fluorinated copolymer latex is used as a binder for producing an electrode, the battery properties are less likely to be lowered. The metal components contained in the fluorinated copolymer latex can be reduced by using materials with a low content of the metal components and by reducing the amount of addition of an inorganic salt or the like added as the pH adjusting agent at the time of polymerization as far as possible. Particularly, the content of sodium and the content of iron are preferably within the above ranges.

<Binder for Producing Electrode>

The fluorinated copolymer latex of the present invention may be used as a binder for producing an electrode as it is.

Otherwise, a flocculant may be added to the obtained fluorinated copolymer latex so that the fluorinated copolymer particles in the latex are agglomerated and isolated. As the flocculant, any flocculant may be used so long as it is commonly used for agglomeration of the fluorinated polymer latex. It may, for example, be specifically a water-soluble salt such as calcium chloride, magnesium chloride, aluminum chloride or aluminum nitrate; an acid such as nitric acid, hydrochloric acid or sulfuric acid; or a water-soluble organic liquid such as an alcohol or acetone. Further, the fluorinated copolymer may be frozen for agglomeration.

The storage battery device may, for example, be a lithium ion primary battery, a lithium ion secondary battery, a lithium polymer battery, an electric double layer capacitor or a lithium ion capacitor. Particularly, the fluorinated copolymer latex of the present invention is preferably used for a lithium ion secondary battery, whereby the adhesion, the electrolytic solution resistance, the battery properties, etc. will more effectively be obtained.

<Electrode Mixture for Storage Battery Device>

The electrode mixture for a storage battery device of the present invention (in this specification, sometimes referred to simply as "electrode mixture") contains as the binder for producing an electrode the fluorinated copolymer latex of the present invention and further, contains an electrode active material. As the case requires, it may contain an electrically conductive material and may contain other components.

Especially an electrode mixture to be used for producing a positive electrode preferably contains an electrically conductive material. By containing an electrically conductive material, electrical contact of electrode active materials will be improved, the electrical resistance in the active material layer can be lowered, and the discharge rate property of a non-aqueous secondary battery can be improved.

As such an electrically conductive material, electrically conductive carbon such as acetylene black, Ketjenblack, carbon black, graphite, vapor phase grown carbon fibers or carbon nanotubes may, for example, be mentioned. The content of the electrically conductive material in the electrode mixture is preferably from 0.1 to 30 parts by mass, more preferably from 1 to 10 parts by mass, per 100 parts by mass of the electrode active material.

When the electrode mixture contains an electrically conductive material in a content within such a range, the effect to reduce the electrical resistance is large with an addition of a small amount of the electrically conductive material, such being favorable.

As other components, components known for an electrode mixture may be used. Specific examples include water-soluble polymers such as carboxymethylcellulose, polyvinyl alcohol, polyacrylic acid and polymethacrylic acid.

<Electrode for Storage Battery Device>

The electrode for a storage battery device of the present invention comprises a current collector, and an electrode active material layer formed by using the electrode mixture for a storage battery device of the present invention on the current collector.

The electrode for a storage battery device of the present invention is obtained by applying the electrode mixture of the present invention to at least one surface, preferably both surfaces of a current collector, followed by drying to form an electrode active material layer. As the case requires, the electrode active material layer after dried is pressed into a desired thickness.

The current collector is not particularly limited so long as it is one made of an electrically conductive material, but usually, a metal foil, a metal net, a metal madreporite or the like, of aluminum, nickel, stainless steel, copper or the like, may be mentioned. As the positive electrode current collector, aluminum is preferably used, and as the negative electrode current collector, copper is preferably used. The thickness of the current collector is preferably from 1 to 100 μm.

As a method of applying the electrode mixture to the current collector, various coating methods may be mentioned, such as a doctor blade method, a dipping method, a reverse roll method, a direct roll method, a gravure method, an extrusion method or a brush coating method. The coating temperature is not particularly limited and is usually preferably a temperature in the vicinity of room temperature. Drying may be carried out by various drying methods, such as drying by warm air, hot air or low humidity air, vacuum drying or drying by irradiation with (far) infrared ray or electron beams. The drying temperature is not particularly limited, and is usually preferably from room temperature to 200° C. in the case of e.g. a heating type vacuum dryer. As a pressing method, mold pressing or roll pressing may be carried out.

<Lithium Ion Secondary Battery>

A lithium ion secondary battery as a storage battery device preferably comprises the electrode for a storage battery device of the present invention as at least one electrode of a positive electrode and a negative electrode and further comprises an electrolytic solution and a separator.

As a solvent of the electrolytic solution, an aprotic organic solvent such as an alkyl carbonate or an alkylene carbonate such as dimethyl carbonate (DMC), ethylene carbonate (EC), diethyl carbonate (DEC), propylene carbonate (PC), butylene carbonate (BC) or methylethyl carbonate (MEC); an ester such as γ-butyrolactone or methyl formate or an ether such as 1,2-dimethoxyethane or tetrahydrofuran; or a sulfur-containing compound such as sulfolane or dimethylsulfoxide, may be used. Particularly preferred is dimethyl carbonate, ethylene carbonate, propylene carbonate, diethyl carbonate or methylethyl carbonate, which has a particularly high ionic conductivity and of which the use temperature range is broad. They may be used alone or as a mixture of two or more.

As an electrolyte, a lithium salt such as $LiClO_4$, $LiBF_4$, $LiPF_6$, $LiAsF_5$, $CF_3SO_3Li$ or $(CF_3SO_2)_2NLi$ may be mentioned.

EXAMPLES

Now, Examples of the present invention will be described. However, the present invention is by no means restricted to such specific Examples. Tests and evaluation in Examples and Comparative Examples were carried out by the following methods.

(1) Mass Average Molecular Weight

The mass average molecular weight of the fluorinated copolymer was measured by gel permeation chromatography (GPC) under the following conditions.

GPC apparatus: HLC-8220 manufactured by TOSOH CORPORATION
Column: shodex KF-806M (two columns), shodex KF-802 (one column) manufactured by SHOWA DENKO K.K.
Detector: RI detector (differential refractometer)
Solvent: Tetrahydrofuran
Temperature: 40° C.
Flow rate: 1.0 mL/min
Concentration: 0.5 mass %
Standard substance: Polystyrene (2) Average Particle Size The average particle size of the copolymer particles in the fluorinated copolymer latex was measured by a dynamic light scattering method using laser zeta electrometer ELS-8000 manufactured by Otsuka Electronics Co., Ltd.

(3) Copolymer Composition

The fluorinated copolymer was dissolved in deuterated tetrahydrofuran, and $^{13}C$-NMR was measured to analyze the copolymer composition of the fluorinated copolymer.

(4) Polymerization Rate

At a point where the polymerization pressure started decreasing was regarded as the polymerization initiation point, a monomer mixture gas was injected by its own pressure to achieve a constant pressure in the progress of polymerization, the total amount of the monomer mixture gas injected after initiation of the polymerization until completion of the polymerization was divided by a product of the total polymerization time and the amount of the aqueous medium in the reactor, and the obtained value was regarded as the polymerization rate (unit: g/L·hour) per unit time and unit volume.

(5) Content (Mass %) of Fluorinated Copolymer

The fluorinated copolymer latex was dried in a circulating hot air oven at 120° C. for 3 hours and cooled in a desiccator. The mass of the fluorinated copolymer after drying was divided by the mass of the fluorinated copolymer latex before drying to obtain the content of the fluorinated copolymer in the latex.

(6) Metal Component in Latex

The fluorinated copolymer latex was pre-treated by a sulfuric acid ashing method, and quantitative determination by an ICP-AES method was carried out. A content of less than 5 mm (<5.0 ppm) in the case of potassium and a content of less than 0.5 ppm (<0.5 ppm) in the case of metal components other than potassium are contents lower than the detection limits.

(7) Latex Stability 20 g of the fluorinated polymer latex was put in a thin-film spin system high-speed mixer "T.K. FILMIX 40-40" manufactured by PRIMIX Corporation, stirred at 25° C. at a circumferential velocity of 15 m/s for 150 seconds and filtrated through a 200 mesh wire mesh, and the proportion of the broken latex was calculated by the following formula from the mass (a) of the fluorinated copolymer on the wire mesh. The lower this value, the more excellent the stability of the latex.

Proportion (mass %) of broken latex=$(a)/\{20\times content\ (mass\ \%)\ of\ fluorinated\ copolymer\}\times 100$ (8) Coating Property of Electrode Mixture The electrode mixture was applied on a current collector and dried, and the surface of the electrode was visually observed to confirm coating lines and pinholes, and evaluation was made based on the following standards from the amount on the electrode (15 cm×15 cm) surface.

⊚ (excellent): No coating lines nor pinholes with a width of 0.5 mm or larger confirmed at all on the electrode surface.

○ (good): At most 2 coating lines or pinholes with a width of 0.5 mm or larger on the electrode surface Δ (poor): Two or more coating lines or pinholes with a width of 0.5 mm or larger confirmed on the electrode surface (9) Adhesion (Peel Strength)

The electrode mixture was applied to a current collector to produce an electrode, which was cut into a strip with a width of 2 cm×length of 10 cm, and the strip was fixed so that the coating film of the electrode mixture faced upward. A cellophane tape was bonded to the electrode mixture coating film surface, and the strength (N) when the tape was peeled at a rate of 10 mm/min in the direction of 90° was measured five times, and the average value was regarded as the peel strength. The higher this value, the more excellent the adhesion (binding property).

Example 1

Main composition and production conditions are shown in Table 1 (the same applies hereinafter).

A pressure resistant reactor having an internal capacity of 3,200 mL made of stainless steel equipped with a stirring anchor blade was deaerated, and to this reactor, 1,700 g of deionized water, 13.3 g of sodium lauryl sulfate and 4.4 g of ammonium persulfate (one-hour half-life temperature: 82° C.) were added. Then, a monomer mixture gas of tetrafluoroethylene (hereinafter referred to as TFE)/propylene (hereinafter referred to as P)=88/12 (molar ratio) was injected so that the internal pressure of the reactor became 2.50 MPaG. The anchor blade was rotated at 300 rpm to initiate the polymerization reaction.

Since the pressure in the reactor decreased along with the progress of the polymerization, when the internal pressure of the reactor decreased to 2.49 MPaG, a monomer mixture gas of TFE/P=56/44 (molar ratio) was injected by its own pressure to increase the internal pressure of the reactor to 2.51 MPaG. This operation was repeatedly carried out to keep the internal pressure of the reactor to be from 2.49 to 2.51 MPaG, and the polymerization reaction was continued. When the total amount of the monomer mixture gas of TFE/P injected reached 700 g, the internal temperature of the reactor was decreased to 10° C. to terminate the polymerization reaction thereby to obtain a latex containing fluorinated copolymer A.

The polymerization rate was 73 g/L·hour. The content of fluorinated copolymer A in the latex was 29 mass %, and the average particle size of particles of fluorinated copolymer A was 75 nm. The mass average molecular weight of fluorinated copolymer A was 130,000, and the copolymer composition was repeating units based on TFE/repeating units based on P=56/44 (molar ratio). Further, the content of metal components in the latex was measured. These measurement results are shown in Table 2 (the same applies hereinafter).

Using the obtained fluorinated copolymer A latex as a binder, an electrode mixture was prepared.

That is, 100 parts by mass of $LiCoO_2$ (manufactured by AGC Seimi Chemical Co., Ltd., tradename: "Selion C", tap density: 2.4 g/cm³, average particle size: 12 μm) as a positive electrode active material and 7 parts by mass of acetylene black as an electrically conductive material were mixed, and 40 parts by mass of a carboxymethylcellulose aqueous solution having a concentration of 1 mass % as a viscosity adjusting agent was added, followed by kneading, and 10 parts by mass of the fluorinated copolymer A latex was added to obtain electrode mixture 1.

The coating property and the adhesion of the electrode mixture were evaluated by the above methods. The evaluation results are shown in Table 2.

Example 2

A latex containing fluorinated copolymer B was obtained by carrying out polymerization in the same manner as in Example 1 except that the amount of sodium lauryl sulfate was 17.7 g. The polymerization rate was 60 g/L·hour. The content of fluorinated copolymer B in the latex was 29 mass %, and the average particle size of particles of fluorinated copolymer B was 67 nm.

The mass average molecular weight of fluorinated copolymer B was 120,000, and the copolymer composition was repeating units based on TFE/repeating units based on P=56/44 (molar ratio).

Further, in the same manner as in Example 1, electrode mixture 2 was prepared and evaluated in the same manner. The evaluation results are shown in Table 2.

Example 3

In the same reactor as in Example 1, 1,700 g of deionized water, 13.3 g of sodium lauryl sulfate, 2.0 g of sodium hydroxide, 4 g of disodium hydrogen phosphate dodecahydrate and 4.4 g of ammonium persulfate were added. Then, at 75° C., a monomer mixture gas of TFE/P=88/12 (molar ratio) was injected so that the internal pressure of the reactor became 2.50 MPaG. The anchor blade was rotated at 300 rpm to initiate the polymerization reaction.

After that, in the same manner as in Example 1, polymerization was carried out to obtain a latex containing fluorinated copolymer C. The polymerization rate was 75 g/L·hour. The content of fluorinated copolymer C in the latex was 29 mass %, and the average particle size of particles of fluorinated copolymer C was 69 nm.

The mass average molecular weight of fluorinated copolymer C was 130,000, and the copolymer composition was repeating units based on TFE/repeating units based on P=56/44 (molar ratio).

Further, in the same manner as in Example 1, electrode mixture 3 was prepared and evaluated in the same manner. The evaluation results are shown in Table 2.

Example 4

A latex containing fluorinated copolymer D was obtained by carrying out polymerization in the same manner as in Example 2 except that the polymerization reaction was terminated when the total amount of the monomer mixture gas of TFE/P injected reached 900 g. The polymerization rate was 60 g/L·hour. The content of fluorinated copolymer D in the latex was 35 mass %, and the average particle size of particles of the fluorinated copolymer D was 76 nm.

The mass average molecular weight of fluorinated copolymer D was 150,000, and the copolymer composition was repeating units based on TFE/repeating units based on P=56/44 (molar ratio).

Further, electrode mixture 4 was prepared in the same manner as in Example 1 and evaluated in the same manner. The evaluation results are shown in Table 2.

Example 5

A latex of fluorinated copolymer E was obtained in the same manner as in Example 2 except that in Example 1, the ratio of the monomer mixture gas first injected to the reactor was changed from TFE/P=88/12 (molar ratio) to TFE/P=91/9 (molar ratio), and the ratio of the monomer mixture gas injected during progress of the polymerization was changed from TFE/P=56/44 (molar ratio) to TFE/P=58/42 (molar ratio). The polymerization rate was 75 g/L·hour. The content of fluorinated copolymer E in the latex was 29 mass %, and the average particle size of particles of fluorinated copolymer E was 68 nm.

The mass average molecular weight of fluorinated copolymer E was 120,000, and the copolymer composition was repeating units based on TFE/repeating units based on P=58/42 (molar ratio).

Further, in the same manner as in Example 1, electrode mixture 5 was prepared and evaluated in the same manner. The evaluation results are shown in Table 2.

Example 6

A latex of fluorinated copolymer F was obtained in the same manner as in Example 2 except that in Example 1, the ratio of the monomer mixture gas first injected to the reactor was changed from TFE/P=88/12 (molar ratio) to TFE/P=84/16 (molar ratio), and the ratio of the monomer mixture gas injected during progress of the polymerization was changed from TFE/P=54/44 (molar ratio) to TFE/P=54/46 (molar ratio). The polymerization rate was 58 g/L·hour. The content of fluorinated copolymer F in the latex was 29 mass %, and the average particle size of particles of fluorinated copolymer F was 69 nm.

The mass average molecular weight of fluorinated copolymer F was 130,000, and the copolymer composition was repeating units based on TFE/repeating units based on P=54/46 (molar ratio).

Further, in the same manner as in Example 1, electrode mixture 6 was prepared and evaluated in the same manner. The evaluation results are shown in Table 2.

Example 7

A latex of fluorinated copolymer G was obtained in the same manner as in Example 2 except that in Example 1, the ratio of the monomer mixture gas first injected to the reactor was changed from TFE/P=88/12 (molar ratio) to TFE/P=76/24 (molar ratio), and the ratio of the monomer mixture gas injected during progress of the polymerization was changed from TFE/P=56/44 (molar ratio) to TFE/P=52/48 (molar ratio). The polymerization rate was 56 g/L·hour. The content of fluorinated copolymer G in the latex was 29 mass %, and the average particle size of particles of fluorinated copolymer G was 67 nm.

The mass average molecular weight of fluorinated copolymer G was 120,000, and the copolymer composition was repeating units based on TFE/repeating units based on P=52/48 (molar ratio).

Further, in the same manner as in Example 1, electrode mixture 7 was prepared and evaluated in the same manner. The evaluation results are shown in Table 2.

Comparative Example 1

A latex containing fluorinated copolymer H was obtained by carrying out polymerization in the same manner as in Example 1 except that the amount of sodium lauryl sulfate was 8.9 g. The polymerization rate was 80 g/L·hour. The content of fluorinated copolymer E in the latex was 28 mass %, and the average particle size of particles of fluorinated copolymer H was 80 nm.

The mass average molecular weight of fluorinated copolymer H was 150,000, and the copolymer composition was repeating units based on TFE/repeating units based on P=56/44 (molar ratio).

Further, in the same manner as in Example 1, electrode mixture 8 was obtained. The evaluation results are shown in Table 2.

Comparative Example 2

Into the same reactor as in Example 1, 1,579 g of deionized water, 8.9 g of sodium lauryl sulfate, 2.0 g of sodium hydroxide, 58 g of disodium hydrogen phosphate dodecahydrate, 4.2 g of ammonium persulfate and 100 g of tert-butanol were added. Further, an aqueous solution having 0.27 g of disodium ethylenediaminetetraacetate dihydrate and 0.36 g of ferrous sulfate heptahydrate preliminarily dissolved in 200 g of deionized water was poured. Then, at 40° C., a monomer mixture gas of TFE/P=88/12 (molar ratio) was injected so that the internal pressure of the reactor became 2.50 MPaG. The anchor blade was rotated at 300 rpm, and a 2.5 mass % aqueous solution of sodium hydroxymethanesulfinate dihydrate (hereinafter sometimes referred to as Rongalite) having its pH adjusted to 10.0 with sodium hydroxide was added to initiate the polymerization reaction. After that, the Rongalite 2.5 mass % aqueous solution was continuously added by a high pressure pump.

After that, in the same manner as in Example 1, polymerization was carried out to obtain a latex containing fluorinated copolymer I. The polymerization rate was 80 g/L·hour. The content of fluorinated copolymer I in the latex was 30 mass %, and the average particle size of particles of fluorinated copolymer I was 100 nm.

The mass average molecular weight of fluorinated copolymer I was 200,000, and the copolymer composition was repeating units based on TFE/repeating units based on P=56/44 (molar ratio).

Further, in the same manner as in Example 1, electrode mixture 9 was prepared and evaluated in the same manner. The evaluation results are shown in Table 2.

This Example shows a method of generating radicals by a reaction by a redox catalyst to carry out copolymerization. That is, ammonium sulfate which is a thermally decomposable radical polymerization initiator is contained, however, the polymerization temperature is so low as 40° C., and this method is different from a method of generating radicals by thermally decomposing ammonium sulfate.

Comparative Example 3

Into the same reactor as in Example 1, 1,579 g of deionized water, 8.9 g of sodium lauryl sulfate, 100 g of t-butanol and 4.4 g of ammonium persulfate were added. Then, at 75° C., a monomer mixture gas of TFE/P=88/12 (molar ratio) was injected so that the internal pressure of the reactor became 2.50 MPaG. The anchor blade was rotated at 300 rpm to initiate the polymerization reaction.

After that, in the same manner as in Example 1, polymerization was carried out to obtain a latex containing fluorinated copolymer J. The polymerization rate was 85 g/L·hour. The content of fluorinated copolymer J in the latex was 30 mass %, and the average particle size of particles of fluorinated copolymer J was 98 nm.

The mass average molecular weight of fluorinated copolymer J was 160,000, and the copolymer composition was repeating units based on TFE/repeating units based on P=56/44 (molar ratio).

Further, in the same manner as in Example 1, electrode mixture 10 was prepared and evaluated in the same manner. The evaluation results are shown in Table 2.

TABLE 1

|  |  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|---|
| Aqueous medium | Deionized water (g) | 1700 | 1700 | 1700 | 1700 | 1700 | 1700 | 1700 | 1700 | 1579 | 1579 |
|  | tert-butanol (g) | 0 | 0 | 0 | 0 | 0 | 0 | 0 | 0 | 100 | 100 |
| Anionic emulsifying agent | Sodium lauryl sulfate (g) | 13.3 | 17.7 | 13.3 | 17.7 | 13.3 | 13.3 | 13.3 | 8.9 | 8.9 | 8.9 |
|  | Proportion (parts by mass) per 100 parts by mass of fluorinated copolymer | 1.90 | 2.53 | 1.90 | 1.97 | 1.90 | 1.90 | 1.90 | 1.27 | 1.27 | 1.27 |
| pH adjusting agent | Sodium hydroxide (g) | 0 | 0 | 2.0 | 0 | 0 | 0 | 0 | 0 | 2.0 | 0.0 |
|  | Disodium hydrogen phosphate dodecahydrate (g) | 0 | 0 | 4.0 | 0 | 0 | 0 | 0 | 0 | 58.0 | 0.0 |
| Thermally decomposable radical polymerization initiator | Ammonium persulfate (g) | 4.4 | 4.4 | 4.4 | 4.4 | 4.4 | 4.4 | 4.4 | 4.4 | 4.2 | 4.4 |
|  | Proportion (parts by mass) per 100 parts by mass of fluorinated copolymer | 0.63 | 0.63 | 0.63 | 0.49 | 0.63 | 0.63 | 0.63 | 0.63 | 0.60 | 0.63 |
| Redox catalyst | Disodium ethylenediaminetetraacetate dihydrate (g) | 0 | 0 | 0 | 0 | 0 | 0 | 0 | 0 | 0.27 | 0 |
|  | Deionized water (g) | 0 | 0 | 0 | 0 | 0 | 0 | 0 | 0 | 200 | 0 |
|  | Ferrous sulfate heptahydrate (g) | 0 | 1.0 | 0 | 0 | 0 | 0 | 0 | 0 | 0.36 | 0 |
| Monomer supplied in polymerization reaction period | TFE/P (molar ratio) | 56/44 | 56/44 | 56/44 | 56/44 | 58/44 | 54/44 | 52/48 | 56/44 | 56/44 | 56/44 |
|  | Monomer mixture gas (g) | 700 | 700 | 700 | 900 | 700 | 700 | 700 | 700 | 700 | 700 |
| Polymerization temperature (° C.) |  | 75 | 75 | 75 | 75 | 75 | 75 | 75 | 75 | 40 | 75 |
| Polymerization rate (g/L · hour) |  | 73 | 60 | 75 | 60 | 75 | 58 | 56 | 80 | 80 | 85 |
| Fluorinated copolymer obtained |  | A | B | C | D | E | F | G | J | I | J |

TABLE 2

|  |  | Ex. 1 | Ex. 2 | Ex. 3 | Ex. 4 | Ex. 5 | Ex. 6 |
|---|---|---|---|---|---|---|---|
| Fluorinated copolymer in latex |  | A | B | C | D | E | F |
| Fluorinated copolymer | Copolymer composition TFE units/P units (molar ratio) | 56/44 | 56/44 | 56/44 | 56/44 | 58/44 | 54/44 |
|  | Mass average molecular weight | 130000 | 120000 | 130000 | 150000 | 120000 | 130000 |
| Fluorinated copolymer latex | Average particle size (nm) of copolymer particles | 75 | 67 | 69 | 76 | 68 | 69 |
|  | Content (mass %) of fluorinated copolymer | 29 | 29 | 29 | 35 | 29 | 29 |
|  | Sodium content (mass %) | 0.04 | 0.06 | 0.11 | 0.05 | 0.06 | 0.05 |
|  | Iron content (ppm) | <0.5 | <0.5 | <0.5 | <0.5 | <0.5 | <0.5 |
|  | Copper content (ppm) | <0.5 | <0.5 | <0.5 | <0.5 | <0.5 | <0.5 |
|  | Potassium content (ppm) | <5.0 | <5.0 | <5.0 | <5.0 | <5.0 | <5.0 |
|  | Magnesium content (ppm) | <0.5 | <0.5 | <0.5 | <0.5 | <0.5 | <0.5 |
|  | Calcium content (ppm) | <0.5 | <0.5 | <0.5 | <0.5 | <0.5 | <0.5 |
|  | Chromium content (ppm) | <0.5 | <0.5 | <0.5 | <0.5 | <0.5 | <0.5 |
|  | Manganese content (ppm) | <0.5 | <0.5 | <0.5 | <0.5 | <0.5 | <0.5 |
|  | Nickel content (ppm) | <0.5 | <0.5 | <0.5 | <0.5 | <0.5 | <0.5 |
|  | Cobalt content (ppm) | <0.5 | <0.5 | <0.5 | <0.5 | <0.5 | <0.5 |
|  | Zinc content (ppm) | <0.5 | <0.5 | <0.5 | <0.5 | <0.5 | <0.5 |
|  | Content (parts by mass) of aqueous organic solvent per 100 parts by mass of water | 0 | 0 | 0 | 0 | 0 | 0 |
| Proportion of broken latex (latex stability) (%) |  | 3 | 1 | 4 | 9 | 1 | 2 |
| Electrode mixture coating property |  | ◎ | ◎ | ◎ | ○ | ◎ | ◎ |
| Peel strength (adhesion) (N) |  | 1.8 | 2.0 | 1.8 | 1.6 | 2.1 | 2.2 |

|  |  | Ex. 7 | Comp. Ex. 1 | Comp. Ex. 2 | Comp. Ex. 3 |
|---|---|---|---|---|---|
| Fluorinated copolymer in latex |  | G | J | I | J |
| Fluorinated copolymer | Copolymer composition TFE units/P units (molar ratio) | 52/48 | 56/44 | 56/44 | 56/44 |
|  | Mass average molecular weight | 120000 | 150000 | 200000 | 160000 |
| Fluorinated copolymer latex | Average particle size (nm) of copolymer particles | 67 | 80 | 100 | 98 |
|  | Content (mass %) of fluorinated copolymer | 29 | 28 | 30 | 30 |
|  | Sodium content (mass %) | 0.06 | 0.03 | 0.36 | 0.03 |
|  | Iron content (ppm) | <0.5 | <0.5 | 13.5 | <0.5 |
|  | Copper content (ppm) | <0.5 | <0.5 | <0.5 | <0.5 |
|  | Potassium content (ppm) | <5.0 | <5.0 | <5.0 | <5.0 |
|  | Magnesium content (ppm) | <0.5 | <0.5 | <0.5 | <0.5 |

TABLE 2-continued

| | | | | |
|---|---|---|---|---|
| Calcium content (ppm) | <0.5 | <0.5 | <0.5 | <0.5 |
| Chromium content (ppm) | <0.5 | <0.5 | <0.5 | <0.5 |
| Manganese content (ppm) | <0.5 | <0.5 | <0.5 | <0.5 |
| Nickel content (ppm) | <0.5 | <0.5 | <0.5 | <0.5 |
| Cobalt content (ppm) | <0.5 | <0.5 | <0.5 | <0.5 |
| Zinc content (ppm) | <0.5 | <0.5 | <0.5 | <0.5 |
| Content (parts by mass) of aqueous organic solvent per 100 parts by mass of water | 0 | 0 | 19.0 | 6.3 |
| Proportion of broken latex (latex stability) (%) | 2 | 54 | 7 | 8 |
| Electrode mixture coating property | ⊚ | Δ | ○ | ○ |
| Peel strength (adhesion) (N) | 1.9 | 0.5 | 1.0 | 1.0 |

As shown in Tables 1 and 2, Examples 1 to 7 and Comparative Example 1 are Examples in which no redox catalyst is used and no tert-butanol which is a water-soluble organic solvent was used, however, in Examples 1 to 7 in which an anionic emulsifying agent was used in an amount of at least 1.5 parts by mass per 100 parts by mass of the fluorinated copolymer, a fluorinated copolymer latex with favorable stability was obtained.

Whereas, in Comparative Example 1 in which the amount of use of an anionic emulsifying agent is so low as 1.27 parts by mass per 100 parts by mass of the fluorinated copolymer, the stability of the latex was poor, and when the latex was stirred, particles of the fluorinated copolymer were united, and the proportion of the broken latex was high.

Particularly by comparison between Example 1 and Comparative Example 1, it was found that the proportion of the broken latex was significantly reduced from 54% to 3% by changing the amount of use of the anionic emulsifying agent per 100 parts by mass of the fluorinated copolymer from 1.27 parts by mass in Comparative Example 1 to 13.3 parts by mass in Example 1.

Comparative Example 2 is an Example in which a redox catalyst was used, and although a fluorinated copolymer latex with favorable stability was obtained, a large amount of metal components are contained in the latex.

Comparative Example 3 is an Example in which no redox catalyst was used, and a mixture of water and tert-butanol was used as an aqueous medium. Although a fluorinated copolymer latex with favorable stability was obtained, use of tert-butanol which is a water-soluble organic solvent is essential.

Further, by comparison between Comparative Example 3 and Comparative Example 1, it is found that the stability of the fluorinated copolymer latex becomes poor if no water-soluble organic solvent is used as in Comparative Example 1 in a case where no redox catalyst is used.

Production Example 1

Production of Secondary Battery

Electrode mixture 1 prepared in Example 1 was applied to an area of about 20 cm×about 20 cm on an aluminum foil (thickness: 20 μm) as a current collector by means of a doctor blade so that the thickness after drying would be 50 μm and dried for 30 minutes on a plate heated at 60° C., and further dried in a vacuum dryer at 120° C. and then rolled by a roll press at room temperature so that the coating layer would be 40 μm, followed by cutting out into a circle with a diameter of 18 mm to obtain positive electrode 1.

Using a lithium metal foil with the same area as positive electrode 1 as a negative electrode and using a polyethylene separator, the lithium metal foil, the separator and the LiCoO$_2$ positive electrode were stacked in a 2016 coin cell to prepare a battery element, and a non-aqueous electrolytic solution of 1 M-LiPF$_6$ in ethylmethyl carbonate/ethylene carbonate (volume ratio of 1:1) was added, followed by sealing to produce a coin type non-aqueous electrolytic solution secondary battery.

Charging was carried out at 25° C. at a constant current corresponding to 0.2C to 4.3V (the voltage represents a voltage to lithium), further charging was carried out at the charging upper limit voltage until the current value became 0.02C, and then, discharging was carried out at a constant current corresponding to 0.2C to 3V, to complete a cycle. The capacity retention (unit: %) of the discharge capacity in the 20th cycle to the discharge capacity at the time of discharging in the first cycle was obtained and used as an index for the charge/discharge measurement of the battery.

Here, 1C represents a value of the current at which a standard capacity of a battery is discharged in 1 hour, and 0.5C represents a current value corresponding to ½ thereof. The capacity retention was 96%.

Comparative Production Example 1

Using electrode mixture 9 prepared in Comparative Example 2, positive electrode 2 was obtained in the same manner as in Production Example 1.

After that, a coin type non-aqueous electrolytic solution secondary battery was produced in the same manner as in Production Example 1, and the capacity retention of the discharge capacity in the 20th cycle was measured under the same conditions, whereupon it was 88%.

INDUSTRIAL APPLICABILITY

According to the production method of the present invention, a latex of a fluorinated copolymer with a low content of metal components such as alkali metals and iron, with a small amount of or no water-soluble organic solvent contained, can be obtained. Such a fluorinated copolymer latex is suitable as a binder for producing an electrode for a storage battery device.

This application is a continuation of PCT Application No. PCT/JP2012/053703, filed on Feb. 16, 2012, which is based upon and claims the benefit of priority from Japanese Patent Application No. 2011-033410 filed on Feb. 18, 2011. The contents of those applications are incorporated herein by reference in its entirety.

What is claimed is:

1. A fluorinated copolymer latex, comprising:
an aqueous medium;
a fluorinated copolymer present in a particulate form in the aqueous medium; and
an anionic emulsifying agent contained in the aqueous medium, wherein the aqueous medium comprises water alone, or water and a water-soluble organic solvent of such that the water-soluble organic solvent is included in an amount of less than 1 part by mass per 100 parts by mass of water, the anionic emulsifying agent is included in an amount of from 1.5 to 5.0 parts by mass per 100 parts by mass of the fluorinated copolymer, the fluorinated copolymer latex includes at least one metal component such that a total content of the at least one metal component is at most 0.2 mass % per 100 mass % of the fluorinated copolymer latex, and the fluorinated copolymer is present in the particulate form having an average particle size of from 20 to 200 nm.

2. The fluorinated copolymer latex according to claim 1, wherein the fluorinated copolymer latex has an iron content of at most 100 ppm per 100 mass % of the fluorinated copolymer latex.

3. The fluorinated copolymer latex according to claim 1, wherein the fluorinated copolymer is included in an amount of from 5 to 40 mass % per 100 mass % of the fluorinated copolymer latex.

4. The fluorinated copolymer latex according to claim 1, wherein the fluorinated copolymer has a mass average molecular weight of from 10,000 to 300,000.

5. The fluorinated copolymer latex according to claim 1, wherein the average particle size is from 30 to 150 nm.

6. The fluorinated copolymer latex according to claim 1, wherein the average particle size is from 50 to 150 nm.

7. The fluorinated copolymer latex according to claim 1, wherein the average particle size is from 50 to 100 nm.

8. The fluorinated copolymer latex according to claim 1, wherein the anionic emulsifying agent is included in an amount of from 1.5 to 3.8 parts by mass per 100 parts by mass of the fluorinated copolymer.

9. The fluorinated copolymer latex according to claim 1, wherein the anionic emulsifying agent is included in an amount of from 1.7 to 3.2 parts by mass per 100 parts by mass of the fluorinated copolymer.

10. The fluorinated copolymer latex according to claim 1, wherein the fluorinated copolymer is included in an amount of from 25 to 35 mass % per 100 mass % of the fluorinated copolymer latex.

11. A binder for producing an electrode of a storage battery device, comprising:
the fluorinated copolymer latex according to claim 1.

12. An electrode mixture for a storage battery device, comprising:
the fluorinated copolymer latex according to claim 1; and
an electrode active material.

13. An electrode for a storage battery device, comprising:
a current collector; and
an electrode active material layer formed on the current collector and made from the electrode mixture according to claim 12.

* * * * *